(12) United States Patent
Iijima et al.

(10) Patent No.: US 7,488,463 B2
(45) Date of Patent: Feb. 10, 2009

(54) CARBON DIOXIDE RECOVERY AND POWER GENERATION

(75) Inventors: Masaki Iijima, Hiroshima-ken (JP);
Takuya Hirata, Hiroshima-ken (JP);
Tomio Mimura, Osaka (JP); Yasuyuki Yagi, Osaka (JP)

(73) Assignees: Mitsubushi Heavy Industries, Ltd., Tokyo (JP); The Kansai Electric Power Co., Inc., Osaka (JP)

( * ) Notice: Subject to any disclaimer, the term of this patent is extended or adjusted under 35 U.S.C. 154(b) by 357 days.

(21) Appl. No.: 11/348,447

(22) Filed: Feb. 7, 2006

(65) Prior Publication Data

US 2006/0248890 A1 Nov. 9, 2006

(30) Foreign Application Priority Data

Feb. 7, 2005 (JP) .............................. 2005-030225

(51) Int. Cl.
*B01D 53/62* (2006.01)
*B01D 53/74* (2006.01)
*B01D 53/78* (2006.01)
*B01D 53/96* (2006.01)

(52) U.S. Cl. ..................... 423/220; 423/437.1; 422/168; 422/187; 422/188; 60/39.01; 60/645; 60/772

(58) Field of Classification Search ................. 423/220, 423/437.1; 422/168, 187, 188; 60/39.01, 60/645, 772

See application file for complete search history.

(56) References Cited

U.S. PATENT DOCUMENTS

| 3,563,696 A | | 2/1971 | Benson | |
|---|---|---|---|---|
| 5,339,633 A | * | 8/1994 | Fujii et al. | ..................... 60/648 |
| 5,344,627 A | * | 9/1994 | Fujii et al. | .................. 423/220 |
| 6,883,327 B2 | * | 4/2005 | Iijima et al. | .................... 60/649 |

FOREIGN PATENT DOCUMENTS

| EP | 0 551 876 A2 | 7/1993 |
|---|---|---|
| EP | 1 473 072 A1 | 11/2004 |
| JP | 3-193116 A | 8/1991 |

* cited by examiner

*Primary Examiner*—Timothy C Vanoy
(74) *Attorney, Agent, or Firm*—Birch, Stewart, Kolasch & Birch LLP

(57) ABSTRACT

The carbon dioxide recovery system includes a carbon dioxide absorption tower which absorbs and removes carbon dioxide from the combustion exhaust gas of a boiler by an absorption liquid, and a regeneration tower which heats and regenerates the loaded absorption liquid with carbon dioxide. The regeneration tower includes plural loaded absorption liquid heating means, which heat the loaded absorption liquid and remove carbon dioxide in the loaded absorption liquid. The turbine includes plural lines which extract plural kinds of steam with different pressures from the turbine and which supply the plural kinds of steam to the plural loaded absorption liquid heating means as their heating sources. The plural lines make the pressure of supplied steam increase from a preceding stage of the plural loaded absorption liquid heating means to a post stage of the plural loaded absorption liquid heating means.

4 Claims, 4 Drawing Sheets

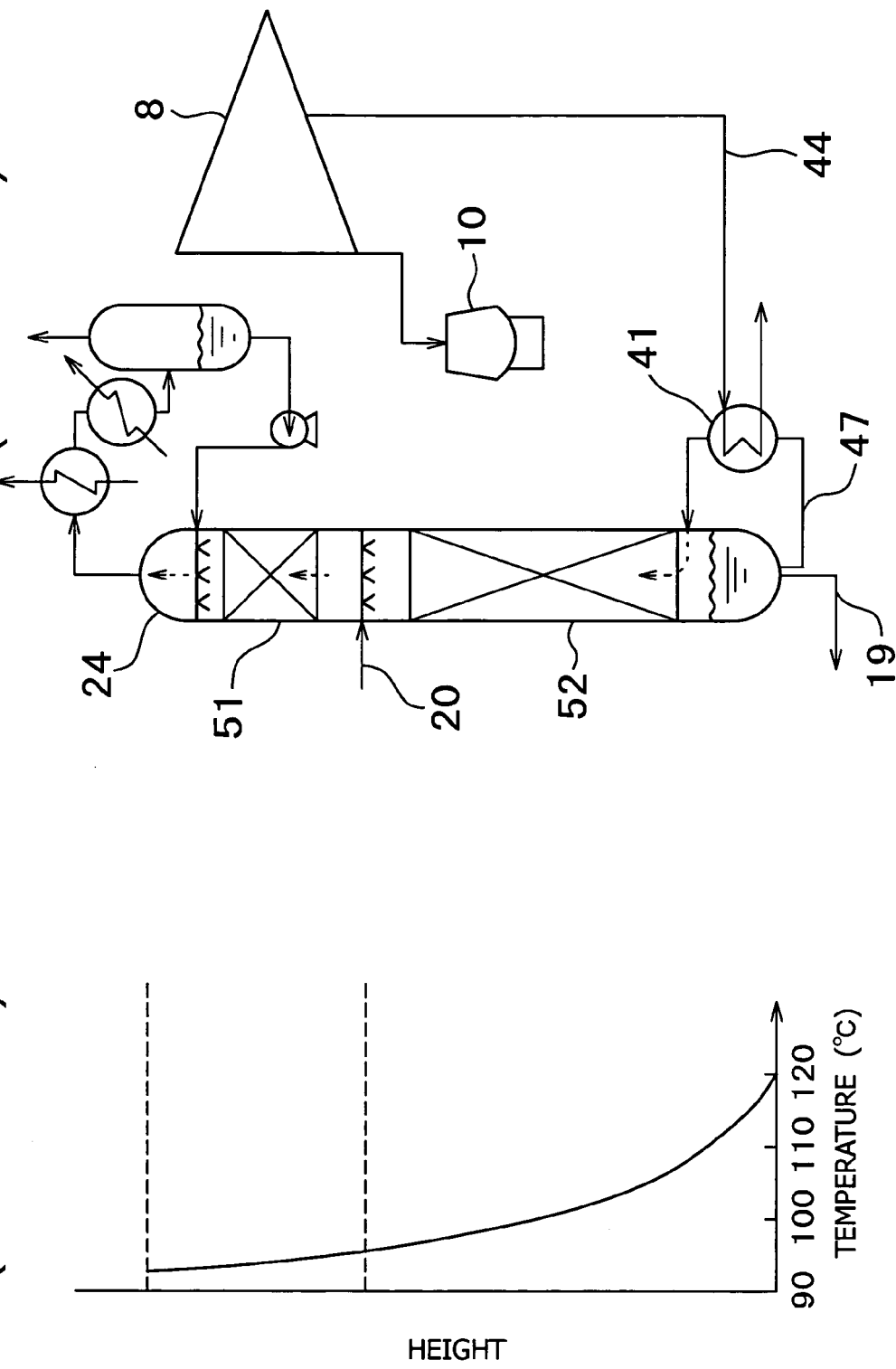

CARBON DIOXIDE RECOVERY AND POWER GENERATION

BACKGROUND OF THE INVENTION

1. Technical Field

The present invention relates to a carbon dioxide recovery system for removing and recovering carbon dioxide contained in a combustion exhaust gas of a boiler in a thermal power plant, a power generation system using the carbon dioxide recovery system, and a method for these systems.

2. Background Art

In a power generation system of a thermal power plant using a large amount of fossil fuel, an amine absorption method is adopted as a method for removing and recovering carbon dioxide ($CO_2$) which is one of the causes of global warming. The amine absorption method has a problem that the large energy consumption at the time of separating and recovering $CO_2$ from a loaded absorption liquid with $CO_2$ absorbed therein significantly lowers the power generation output.

For example, in Japanese Patent Laid-Open No. 3-193116, as shown in FIG. 4A, there is proposed a configuration in which a reboiler 41 is provided for a tower bottom part of a regeneration tower 24 for regenerating a loaded absorption liquid with $CO_2$ absorbed therein, and in which high pressure steam of about 3 $kg/cm^2$ absolute pressure is extracted from a low pressure turbine 8 and is supplied to the reboiler 41 provided for the bottom part of the regeneration tower as a heating source. This enables the loaded absorption liquid of the tower bottom part to be heated to an absorption liquid regeneration temperature of about 110 to 130° C., and hence, $CO_2$ in the loaded absorption liquid is separated so that the absorption liquid is regenerated. However, when all thermal energy required for the reboiler 41 of the tower bottom part is supplemented by the steam extracted from the low pressure turbine 8, the amount of the steam extracted from the low pressure turbine 8 becomes large, which causes a problem that the output of the low pressure turbine 8 is significantly lowered and the power generation output is reduced.

SUMMARY OF THE INVENTION

Therefore, in view of the above described problem, it is an object of the present invention to provide a carbon dioxide recovery system capable of preventing reduction in turbine output at the time of regenerating the absorption liquid with carbon dioxide absorbed therein, a power generation system using the carbon dioxide recovery system, and a method for these systems.

In order to achieve the above described object, according to the present invention, there is provided a carbon dioxide recovery system comprising: a turbine which is driven and rotated by steam; a boiler which generates the steam supplied to the turbine; a carbon dioxide absorption tower which absorbs and removes carbon dioxide from a combustion exhaust gas of the boiler by an absorption liquid; and a regeneration tower which heats and regenerates a loaded adsorption liquid with carbon dioxide absorbed therein, the carbon dioxide recovery system being characterized in that the regeneration tower is provided with plural loaded adsorption liquid heating means in multiple stages, which heat the loaded adsorption liquid and remove carbon dioxide in the loaded adsorption liquid, in that the turbine is provided with plural lines which extract plural kinds of steam with different pressures from the turbine and which supply the extracted plural kinds of steam to the plural loaded adsorption liquid heating means as their heating sources, and in that the plural lines are connected to make the pressure of supplied steam increased from a preceding stage of the plural loaded adsorption liquid heating means to a post stage of the plural loaded adsorption liquid heating means.

As a variant, according to the present invention, there is provided a power generation system characterized by including the above described carbon dioxide recovery system and a generator which generates electric power by the rotation of the turbine.

Further, as a variant, according to the present invention, there is provided a method for recovering carbon dioxide characterized by including the steps of: generating steam by a boiler; supplying the steam to a turbine; extracting plural kinds of steam with different pressures from the turbine; absorbing and removing carbon dioxide by an absorption liquid from a combustion exhaust gas of the boiler; and removing carbon dioxide in a loaded absorption liquid and regenerating the absorption liquid by heating the loaded absorption liquid which absorbs the carbon dioxide with successive use of the plural kinds of steam from the steam with lower pressure.

Further, as a variant, according to the present invention, there is provided a power generation method characterized by including each step of the method for recovering carbon dioxide, and a step of generating electric power by the rotation of the turbine from which the plural kinds of steam with different pressures are extracted.

In the case of the regeneration tower in which the loaded absorption liquid heating means (reboiler) is provided only for the tower bottom part, as shown in FIG. 4B, the temperature of the loaded absorption liquid in the regeneration tower has a distribution formed in such a manner that the temperature is gradually raised from the tower top part to near the tower bottom part and is abruptly raised to the absorption liquid regeneration temperature in the tower bottom part. Thus, according to the present invention, there is provided a configuration in which plural loaded absorption liquid heating means are provided for the regeneration tower in multiple stages, and in which when plural kinds of steam with different pressures are extracted from the turbine and supplied to the plural loaded absorption liquid heating means as their heating sources, the pressure of supplied steam is arranged to be increased from a preceding stage of the plural loaded absorption liquid heating means to a post stage of the plural loaded absorption liquid heating means. As a result, by utilizing the steam with the pressure lower than the pressure of the steam supplied to the loaded absorption liquid heating means of the post stage (tower bottom part), the temperature of the loaded absorption liquid can be increased while the loaded absorption liquid flows down to the tower bottom part in the loaded absorption liquid heating means of the preceding stage. Thereby, the amount of high pressure steam required for heating the loaded absorption liquid by the loaded absorption liquid heating means of the post stage (tower bottom part) can be reduced. Therefore, a part of the high pressure steam extracted from the turbine can be replaced with the steam with the lower pressure, so that it is possible to suppress the reduction in turbine output due to the steam extraction.

Further, the power generation system according to the present invention is configured to comprise the above described carbon dioxide recovery system, and a generator which generates electric power by the rotation of the turbine. Thus, as described above, the reduction in turbine output can be suppressed and thereby power generation output of the generator can be improved.

Further, according to the present invention, the method for recovering carbon dioxide is configured to extract plural kinds of steam with different pressures from the turbine, and to heat the loaded absorption liquid with successive use of the plural kinds of steam with different pressures from the steam with lower pressure. Thus, as described above, it is possible to eventually reduce the amount of the high pressure steam for heating and regenerating the loaded absorption liquid. As a result, a part of the high pressure steam extracted from the turbine can be replaced with the steam with lower pressure, so that it is possible to suppress the reduction in turbine output due to the steam extraction.

Further, according to the present invention, the power generation method is configured by comprising each step of the above described method for recovering carbon dioxide, and a step of generating electric power by the rotation of the turbine from which the plural kinds of steam with different pressures are extracted. Thus, as described above, the reduction in turbine output can be suppressed and thereby power generation output of the generator can be improved.

As described above, according to the present invention, it is possible to provide a carbon dioxide recovery system capable of preventing the reduction in turbine output at the time of regenerating the absorption liquid with carbon dioxide absorbed therein, and a power generation system using the carbon dioxide recovery system, and a method for these systems.

In the following, an embodiment according to the present invention is described with reference to the accompanying drawings.

BRIEF DESCRIPTION OF THE DRAWINGS

FIG. 4A is a schematic illustration of a structure in the vicinity of a regeneration tower of a conventional carbon dioxide recovery type power generation system; and FIG. 4B is a graph showing a temperature distribution in the regeneration tower.

DETAILED DESCRIPTION OF THE PREFERRED EMBODIMENT

Figure 1:
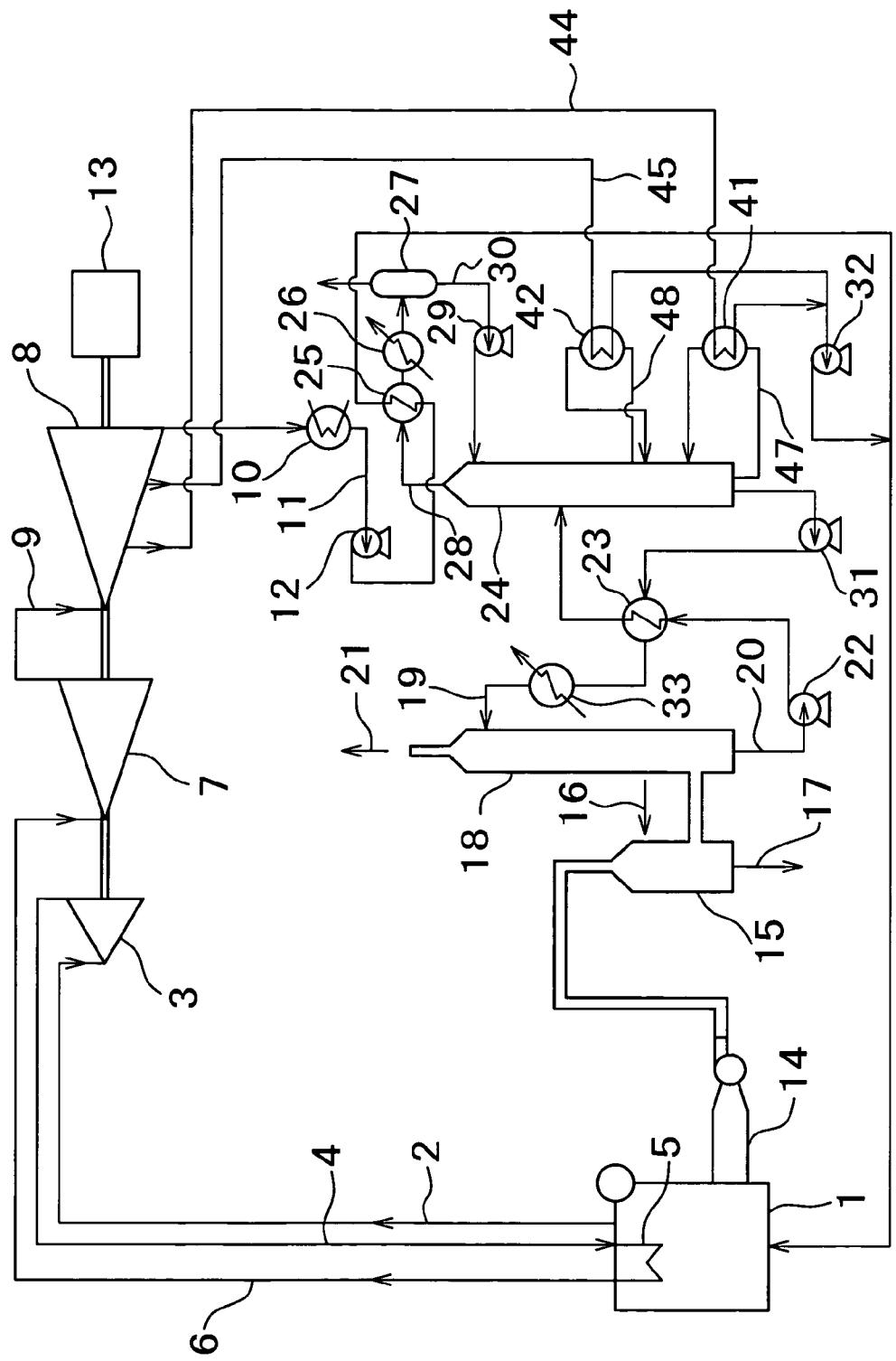
FIG. 1 is a schematic illustration of an embodiment of a carbon dioxide recovery type power generation system according to the present invention.

It is noted that in the accompanying drawings, only main facilities are shown and accessory facilities are omitted. In the drawings, tanks, bulbs, pumps, blowers and heat exchangers are provided as required. Further, two turbines are usually provided in pairs as each of a low pressure turbine, a medium pressure turbine and a high pressure turbine, but each pair of the turbines is also represented by a single reference numeral.

As shown in FIG. 1, the carbon dioxide recovery type power generation system according to the present invention comprises a boiler 1 having a reheating unit 5, a high pressure turbine 3 which is driven by steam of the boiler 1, a medium pressure turbine 7 which is driven by steam discharged from the high pressure turbine 3 and heated by the reheating unit 5, a low pressure turbine 8 which is driven by steam discharged from the medium pressure turbine 7, and a generator 13 which generates electric power by the rotation of these turbines. The exhaust side of the low pressure turbine 8 is connected to the boiler 1 via a line 11 provided with a condenser 10 which condenses the exhaust, and an overhead condenser 25 which effects heat exchange between condensed water and recovered $CO_2$, in this sequence.

Further, on the combustion exhaust gas outlet side of the boiler 1, a blasting blower 14 which pressurizes of a combustion exhaust gas, a cooler 15 which cools the combustion exhaust gas, and a $CO_2$ absorption tower 18 which is filled with $CO_2$ absorption liquid for absorbing and removing $CO_2$ from the combustion exhaust gas are successively arranged in this sequence from the side of the boiler. It is noted that as the $CO_2$ absorption liquid, an alkanolamine such as, for example, monoethanolamine, diethanolamine, triethanolamine, methyldiethanolamine, diisopropanolamine, diglycolamine, is preferred, and an aqueous solution of one of these compositions or an aqueous solution obtained by mixing two or more of these compositions can be used.

The $CO_2$ absorption tower 18 is installed in combination with a regeneration tower 24 which regenerates the loaded adsorption liquid with $CO_2$ absorbed therein. These towers are connected by a line 20 which supplies the loaded absorption liquid to the regeneration tower 24, and by a line 19 which supplies a reproduced adsorption liquid to the $CO_2$ absorption tower 18. A rich/lean solvent heat exchanger 23 which effects heat exchange between the line 20 and the line 19 is provided for the line 20 and the line 19. Further, a lean solvent cooler 33 which further cools the regenerated adsorption liquid is provided for the line 19 between the $CO_2$ absorption tower 18 and the heat exchanger 23.

Figure 2:
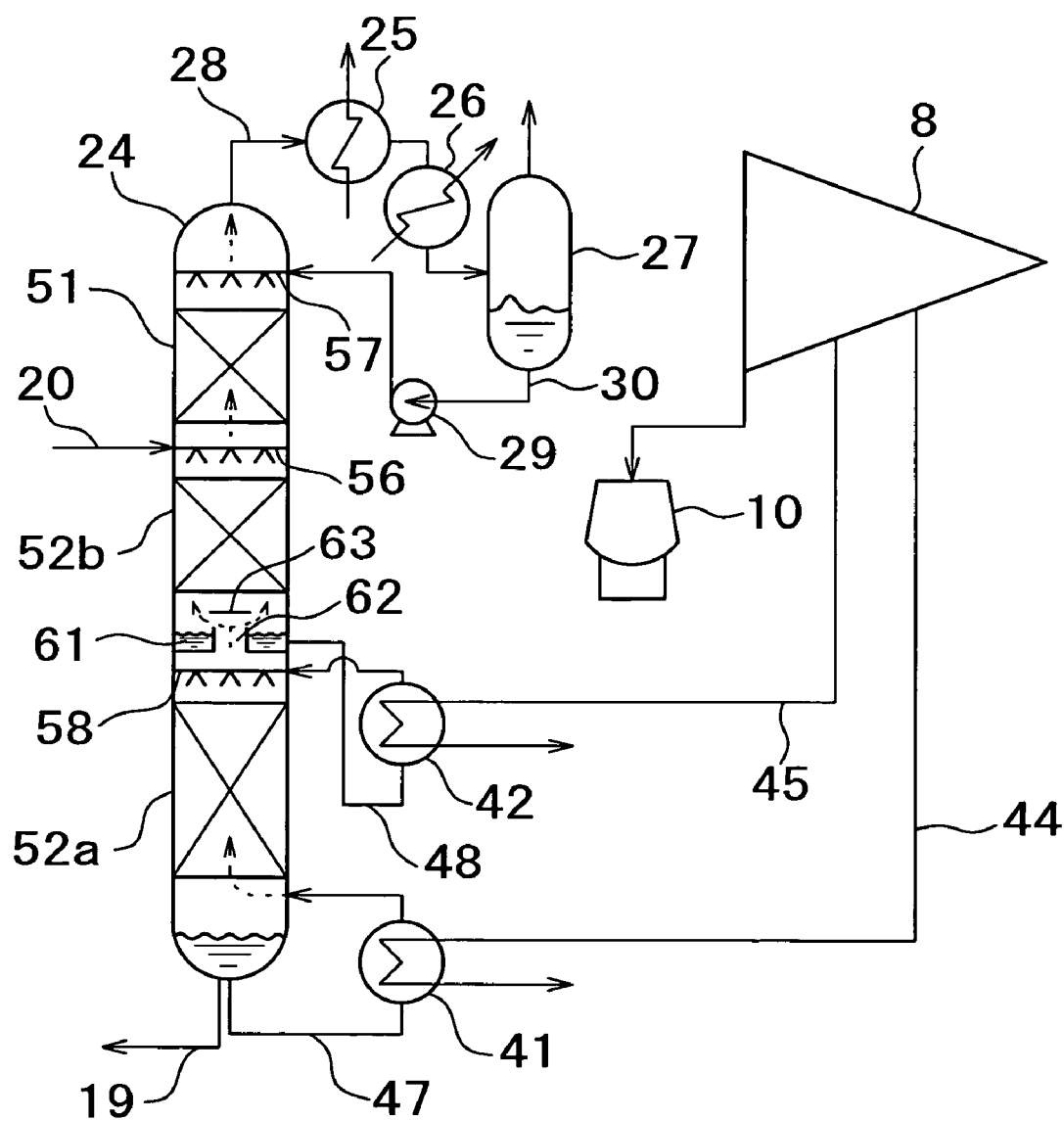
FIG. 2 is a schematic illustration of an internal structure of a regeneration tower in FIG. 1.

In the regeneration tower 24, as shown in FIG. 2, a nozzle 56 for spraying the loaded adsorption liquid downward from the line 20 is provided. Underneath the nozzle 56, a lower filling section 52 filled with a filler is provided in order to make the sprayed loaded adsorption liquid easily brought into contact with steam. Further, above the nozzle 56, an upper filling section 51 filled with a filler is provided in order to remove adsorption liquid steam and mist.

A first reboiler 41 for heating the loaded absorption liquid is provided for a bottom part of the regeneration tower 24. The first reboiler 41 and the regeneration tower 24 are connected by a line 47, which leads the loaded adsorption liquid stored in the tower bottom part to be heated by the first reboiler and then returns the heated absorption liquid again to the tower bottom part. Further, the first reboiler 41 and the low pressure turbine 8 are connected by a line 44 which supplies steam extracted from the low pressure turbine 8 as a heating source of the first reboiler 41.

Further, in the regeneration tower 24, a liquid storage section 61 for storing the loaded adsorption liquid which flows down is provided between the nozzle 56 and the tower bottom part. Thus, the lower filling section 52 is vertically divided into two parts which are positioned above and below the liquid storage section 61. Further, a second reboiler 42 for heating the loaded adsorption liquid is provided for a preceding stage of the first reboiler 41. The second reboiler 42 and the regeneration tower 24 is connected by a line 48, which leads the loaded adsorption liquid stored in the liquid storage section 61 to be heated by the second reboiler and then returns to the lower part of the liquid storage section 61. Further, the second reboiler 42 and the low pressure turbine 8 are connected by a line 45 which supplies, as a heating source of the second reboiler 42, steam with a pressure lower than the pressure of the steam which is extracted to be supplied to the first reboiler 41.

It is noted that a nozzle 58 for spraying the heated loaded adsorption liquid downward is provided for the line 48. Further, a vent hole 62 for allowing $CO_2$ gas ascending from the lower part of the tower to pass upward is provided for the liquid storage section 61. Above the vent hole 62, there is provided a top plate 63 for preventing the loaded adsorption liquid, which flows down from the upper part of the tower, from passing to the lower part of the tower.

Further, a line 28 is provided for the $CO_2$ gas outlet side of the tower top part of the regeneration tower 24, the line 28 being successively provided with an overhead condenser 25 for effecting heat exchange between $CO_2$ gas and condensed water, an overhead cooler 26 for cooling $CO_2$ gas, and a separator 27 for separating water content from $CO_2$ gas, in this sequence. In addition, a line 30 which supplies the water separated by the separator 27 again to the tower top part of the regeneration tower 24 is provided for the separator 27. A nozzle 57 for spraying the reflux water downward is provided for the line 30.

With the above configuration, steam which is generated and heated to a high pressure and a high temperature (of about 250 kg/cm²G, about 600° C.) by the boiler 1 is introduced into the high pressure turbine 3 via a line 2 to drive the high pressure turbine 3. Steam (of about 40 kg/cm²G, about 300° C.) discharged from the high pressure turbine via a line 4 is heated by the reheating unit 5 in the boiler 1. The steam discharged from the high pressure turbine which is reheated (to about 600° C.), is introduced into the intermediate pressure turbine 7 via a line 6, to drive the medium pressure turbine 7. Steam (of about 10 kg/cm²G) discharged from the intermediate pressure turbine is introduced into the low pressure turbine 8 via a line 9 to drive the low pressure turbine 8. In this way, the turbines are driven to enable the generator 13 to generate electric power.

Further, a part of the steam is extracted from the low pressure turbine and supplied via the line 44 to the first reboiler 41 provided for the tower bottom part. Further, a part of steam with a pressure lower than the pressure of the steam supplied to the first reboiler is extracted from the low pressure turbine and supplied to the second reboiler 42 via the line 45. The two kinds of extracted steam are respectively used to heat the loaded absorption liquid in the first reboiler 41 and the second reboiler 42, so as to be condensed. Further, the two kinds of extracted steam are pressurized by a reboiler condensate pump 32, and then mixed with boiler feed water of the line 11. Thereby, the boiler feed water is heated up and transferred to the boiler 1.

Here, the steam which is extracted to be supplied to the first reboiler 41 provided for the tower bottom part, preferably has a temperature which makes it possible to remove almost all $CO_2$ from the loaded absorption liquid to regenerate the absorption liquid, and which for example preferably ranges from 130 to 160° C., although the temperature may be different depending upon the kinds of $CO_2$ absorption liquid. It is noted that the absolute pressure of the steam corresponding to this temperature ranges from 2.75 to 6.31 ata. Further, the steam which is extracted to be supplied to the second reboiler 42 preferably has a temperature lower than the above described temperature, that is, an absolute pressure lower than the above described absolute pressure, in order to heat the loaded absorption liquid in stages. It is noted that when supplied into the regeneration tower 24, the loaded absorption liquid is depressurized to release a part of $CO_2$ and cooled (for example, by a temperature about 20° C.). Therefore, the lower limit value of the steam is preferably set to a temperature which makes it possible to effect heat exchange with the absorption liquid with the temperature when it is introduced into the tower (for example, a temperature higher by about 10° C. compared with the temperature of the absorption liquid after it is introduced into the tower, or a temperature lower by about 10° C. compared with the temperature of the absorption liquid when it is supplied to the tower), that is, preferably set to an absolute pressure corresponding to the steam temperature.

The exhaust (of about 0.05 ata, about 33° C.) of the low pressure turbine 8 is introduced into the condenser 10 via the line 11 and condensed. A boiler feed pump 12 makes the condensed water preheated through the overhead condenser 25 and then transferred to the boiler 1 as the boiler feed water.

On the other hand, the boiler combustion exhaust gas containing $CO_2$ discharged from the boiler 1 is first pressurized by the blasting blower 14, and then transferred to the cooler 15 so as to be cooled by cooling water 16. The cooled combustion exhaust gas is transferred to the $CO_2$ absorption tower 18, and cooling wastewater 17 is discharged to the outside of the system.

In the $CO_2$ absorption tower 18, the combustion exhaust gas is brought into contact in counterflow with $CO_2$ absorption liquid based on the alkanolamine, so that $CO_2$ in the combustion exhaust gas is absorbed by the $CO_2$ absorption liquid through a chemical reaction. The combustion exhaust gas 21 with $CO_2$ removed therefrom is discharged from the tower top part to the outside of the system. The loaded absorption liquid (rich absorption liquid) with $CO_2$ absorbed therein is pressurized by a rich solvent pump 22 via the line 20 connected to the tower bottom part, and heated by the rich/lean solvent heat exchanger 23, and thereafter is supplied to the regeneration tower 24.

In the regeneration tower 24, the loaded absorption liquid is sprayed from the nozzle 56, and flows downward through the lower filling section 52B so as to be stored in the liquid storage section 61. Then, the loaded absorption liquid in the liquid storage section 61 is extracted by the line 48, and heated by the low pressure steam of the line 45 in the second reboiler 42, and thereafter returned again to the regeneration tower 24. The loaded absorption liquid thus heated is sprayed by the nozzle 58, and a $CO_2$ gas partially separated from the absorption liquid by the heating operation ascends upward in the tower as shown by a dotted line in FIG. 2, while the loaded absorption liquid still containing $CO_2$ flows down in the tower.

Further, the loaded absorption liquid, which passes through the lower filling section 52A and is stored in the tower bottom part, is extracted by the line 47 to be heated by the higher pressure steam of the line 44 in the first reboiler 41, and thereafter is returned again to the tower bottom part. The residual $CO_2$ is almost separated from the absorption liquid by this heating operation in the first reboiler 41 of the tower bottom part. The separated $CO_2$ gas ascends in the tower in the same way as described above.

The $CO_2$ gas which ascends in the tower is discharged from the tower top part of the regeneration tower 24. The discharged $CO_2$ gas passes through the line 28, to preheat the boiler feed water of the line 11 in the overhead condenser 25, and is further cooled by the overhead cooler 26. Thereby, the water content in the $CO_2$ gas is condensed. The condensed water is removed by the separator 27. The high purity $CO_2$ gas with water content removed therefrom is discharged to the outside of the power generation system, so as to be able to be used effectively for other applications.

Further, the condensed water separated by the separator 27 is refluxed by a condensed water circulation pump 29 into the regeneration tower 24 through the line 30. The reflux water is sprayed by the nozzle 57 to wash $CO_2$ gas ascending through the upper filling section 51, thereby making it possible to prevent the amine compound contained in the $CO_2$ gas from being discharged from the tower top part.

On the other hand, almost all $CO_2$ is separated from the loaded absorption liquid by the heating operation in the first reboiler of the tower bottom part, so that the absorption liquid is regenerated. The regenerated absorption liquid (lean absorption liquid) is extracted by the line 19, and pressurized by a lean solvent pump 31. Then, the regenerated absorption liquid is cooled by the loaded absorption liquid in the rich/lean solvent heat exchanger 23 and is further cooled by the lean solvent cooler 33 so as subsequently to be supplied to the $CO_2$ absorption tower 18. Thus, the $CO_2$ absorption liquid can be used in circulation in the power generation system.

In this way, high pressure steam is extracted from the low pressure turbine 8 as a heating source of the first reboiler 41 of the tower bottom part, and steam with a pressure lower than the pressure of the high pressure steam is extracted from the low pressure turbine 8 as a heating source of the second reboiler 42 between the nozzle 56 and the tower bottom part, as a result of which the loaded absorption liquid can be heated in stages by the steam extracted in the two stages. Thus, instead of a part of the high pressure steam extracted from the low pressure turbine 8, which part is to be supplied to the first reboiler 41 of the tower bottom part, steam with a lower pressure can be extracted from the low pressure turbine 8, as a result of which output decrease of the low pressure turbine 8 can be suppressed as a whole and power generation output of the generator 13 can be improved.

It is noted that in FIG. 1 and FIG. 2, the reboiler is constituted in two stages by providing the second reboiler 42 between the nozzle 56 and the tower bottom part so as to extract steam from the low pressure turbine 8 in two stages. However, the reboiler provided for the regeneration tower 24 may be constituted in three or more stages to extract steam from the low pressure turbine 8 in three or more stages. In this case, the line which supplies the extracted steam to the reboiler is connected so as to make the pressure of supplied steam increased from the reboiler in the preceding stage of the regeneration tower 24 (the tower top part side) to the reboiler in the post stage of the regeneration tower 24 (the tower bottom part side).

Figure 3:
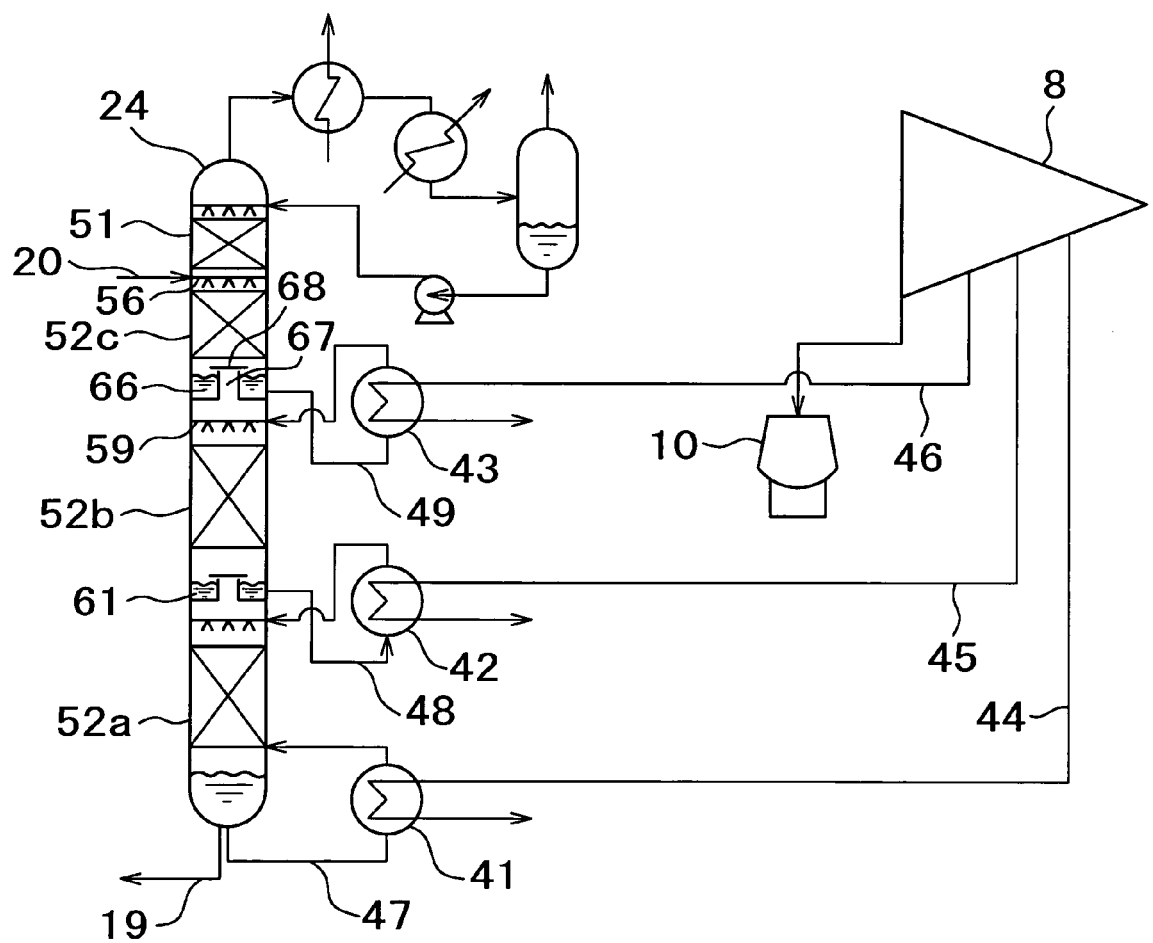
FIG. 3 is a schematic illustration of another embodiment of the carbon dioxide recovery type power generation system according to the present invention.

For example, as shown in FIG. 3, a liquid storage section 66, a vent hole 67 and a top plate 68 are additionally provided between the nozzle 56 and the liquid storage section 61, and a third reboiler 43 is also provided in the preceding stage of the second reboiler 42, so that steam with a pressure further lower than the pressure of the steam supplied to the second reboiler 42 is extracted from the low pressure turbine 8 and is supplied to the third reboiler 43 via a line 46. Thereby, the loaded absorption liquid in the added liquid storage section 66 is heated by the third reboiler 43 via a line 49. As a result, the loaded absorption liquid in the regeneration tower 24 can be heated in more stages. Therefore, instead of a part of the high pressure steam supplied to the first reboiler 41 and the second reboiler 42, the steam with further lower pressure is extracted from the low pressure turbine 8, so that output decrease of the low pressure turbine 8 can be further suppressed.

EXAMPLE

A rich absorption liquid with $CO_2$ absorbed therein is regenerated by using a steam system consisting of the regeneration tower and the low pressure turbine shown in FIG. 3. The result is shown in Table 1. Further, a result of the case where the steam system consisting of the conventional regeneration tower and the low pressure turbine shown in FIG. 4 is used, is also shown in Table 1 as a comparison example.

TABLE 1

| | | CONVENTIONAL SYSTEM (FIG. 4) | PRESENT INVENTION (FIG. 3) |
|---|---|---|---|
| $CO_2$ RECOVERY AMOUNT | | 324 ton/h | 324 ton/h |
| REBOILER INPUT HEAT AMOUNT | | 242.41 Gcal/h | 243.02 Gcal/h |
| REBOILER INPUT STEAM AMOUNT (ABSOLUTE PRESSURE) | FIRST REBOILER | 417 ton/h (3.6 ata) | 174 ton/h (3.6 ata) |
| | SECOND REBOILER | — | 138 ton/h (3.16 ata) |
| | THIRD REBOILER | — | 107 ton/h (2.73 ata) |
| TURBINE OUTPUT DECREASE DUE TO EXTRACTION OF STEAM SUPPLIED TO REBOILER (CONVENTIONAL CASE: 100) | | 76,330 W (100) | 73,756 kW (96.6) |
| RICH ABSORPTION LIQUID SUPPLY AMOUNT | | 3824 ton/h | 3824 ton/h |
| LEAN ABSORPTION LIQUID DISCHARGE AMOUNT | | 3500 ton/h | 3500 ton/h |
| REGENERATION TOWER INLET TEMPERATURE OF RICH ABSORPTION LIQUID | | 112° C. | 112° C. |
| REGENERATION TOWER OUTLET TEMPERATURE OF LEAN ABSORPTION LIQUID | | 120° C. | 120° C. |

As shown in Table 1, in the conventional system, it is necessary to supply high pressure steam of 3.6 ata to the reboiler of the tower bottom part at a rate of 417 ton/h, in order to make the rich absorption liquid of a predetermined amount heated to 120° C. and regenerated. As a result, the output of the low pressure turbine from which the steam is extracted, is lowered by 76,330 kW. On the other hand, in the system according to the present invention shown in FIG. 3, steam with a lower pressure of 2.73 ata and steam with a lower pressure of 3.16 ata are supplied to the third reboiler and the second reboiler at a rate of 107 ton/h and at a rate of 138 ton/h, respectively, so that even when the rate of the high pressure steam of 3.6 ata supplied to the first reboiler of the tower bottom part is reduced to 174 ton/h, the rich absorption liquid can be regenerated similarly to the conventional system. Therefore, the total amount of heat supplied to the first to third reboilers is approximately equal to the amount of heat supplied to the reboiler of the tower bottom part in the conventional system, but the output of the low pressure turbine is lowered only by 73,756 kW. As a result, the turbine output can be improved by about 3.4% in comparison with the conventional system.

What is claimed is:

1. A carbon dioxide recovery system comprising:
a turbine which is driven and rotated by steam;
a boiler which generates the steam supplied to the turbine;
a carbon dioxide absorption tower which absorbs and removes carbon dioxide from a combustion exhaust gas of the boiler by an absorption liquid; and
a regeneration tower which heats and regenerates a loaded absorption liquid with carbon dioxide absorbed therein,
wherein the regeneration tower is provided with plural loaded absorption liquid heating means in multiple stages which heat the loaded absorption liquid and remove carbon dioxide in the loaded absorption liquid,
wherein the turbine is provided with plural lines which extract plural kinds of steam with different pressures from the turbine and which supply the extracted plural kinds of steam to the plural loaded absorption liquid heating means as their heating sources, and wherein the plural lines are connected to make the pressure of supplied steam increased from a preceding stage of the plural loaded absorption liquid heating means to a post stage of the plural loaded absorption liquid heating means.

2. A power generation system comprising: the carbon dioxide recovery system according to claim 1; and a generator which generates electric power by the rotation of the turbine.

3. A method for recovering carbon dioxide, comprising the steps of:

generating steam and combustion exhaust gas by a boiler;
supplying the steam to a turbine;
extracting plural kinds of steam having different stream pressures from the turbine;
absorbing carbon dioxide in the combustion exhaust gas from the boiler by using an absorption liquid; and
removing the carbon dioxide in the absorption liquid by progressively heating the absorption liquid by use of the plural kinds of steam in ascending order of steam pressure.

4. A method for generating electric power, comprising: each step of the method for recovering carbon dioxide according to claim 3; and a step of generating electric power by the rotation of the turbine from which the plural kinds of steam with different pressures are extracted.

* * * * *